(12) United States Patent
Hisada et al.

(10) Patent No.: US 10,946,478 B2
(45) Date of Patent: Mar. 16, 2021

(54) WELDING METHOD AND WELDED STRUCTURE

(71) Applicant: TOYOTA JIDOSHA KABUSHIKI KAISHA, Toyota (JP)

(72) Inventors: Kohei Hisada, Nagoya (JP); Toru Hioki, Miyoshi (JP); Masaki Morino, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 582 days.

(21) Appl. No.: 15/700,766

(22) Filed: Sep. 11, 2017

(65) Prior Publication Data

US 2018/0099357 A1   Apr. 12, 2018

(30) Foreign Application Priority Data

Oct. 11, 2016 (JP) .............................. JP2016-200208

(51) Int. Cl.
| | |
|---|---|
| *B23K 26/22* | (2006.01) |
| *B23K 26/32* | (2014.01) |
| *B23K 26/20* | (2014.01) |
| *B23K 26/082* | (2014.01) |
| *B23K 103/10* | (2006.01) |

(52) U.S. Cl.
CPC ............ *B23K 26/22* (2013.01); *B23K 26/082* (2015.10); *B23K 26/206* (2013.01); *B23K 26/32* (2013.01); *B23K 2103/10* (2018.08)

(58) Field of Classification Search
CPC .............. B23K 2103/10; B23K 26/082; B23K 26/206; B23K 26/22; B23K 26/32
See application file for complete search history.

(56) References Cited

U.S. PATENT DOCUMENTS

| | | | |
|---|---|---|---|
| 5,451,742 A | 9/1995 | Nishio et al. | |
| 5,755,447 A | 5/1998 | Hagiwara et al. | |
| 2014/0377578 A1* | 12/2014 | Hisada | B23K 26/32 |
| | | | 428/594 |
| 2015/0104244 A1 | 4/2015 | Watanabe et al. | |
| 2015/0298255 A1 | 10/2015 | Hisada et al. | |
| 2016/0288261 A1 | 10/2016 | Hisada et al. | |
| 2016/0288262 A1 | 10/2016 | Hisada et al. | |

FOREIGN PATENT DOCUMENTS

| | | |
|---|---|---|
| JP | S59-223180 A | 12/1984 |
| JP | H02-217177 A | 8/1990 |
| JP | H06-001346 A | 1/1994 |
| JP | H07-332500 A | 12/1995 |
| JP | 3135911 B2 | 2/2001 |
| JP | 2009-233712 A | 10/2009 |

(Continued)

OTHER PUBLICATIONS

English-language translation of Dec. 18, 2019 Office Action issued in Chinese Patent Application No. 201710944111.1.

*Primary Examiner* — Dana Ross
*Assistant Examiner* — James F Sims, III
(74) *Attorney, Agent, or Firm* — Oliff PLC

(57) ABSTRACT

Objects to be welded are joined together by laser welding to form adjacent nuggets. When a distance between central axes of the adjacent nuggets is p and a diameter of the adjacent nuggets in the objects to be welded is d, the adjacent nuggets are formed so as to satisfy an equation $1.0 < p/d \leq 1.6$.

6 Claims, 5 Drawing Sheets

(56) References Cited

FOREIGN PATENT DOCUMENTS

| | | |
|---|---|---|
| JP | 5206448 B2 | 6/2013 |
| JP | 2015-021540 A | 2/2015 |
| JP | 2015077610 A | 4/2015 |
| JP | 2015-205323 A | 11/2015 |
| KR | 97-0010887 B1 | 7/1997 |
| WO | 2013/098621 A1 | 7/2013 |

* cited by examiner

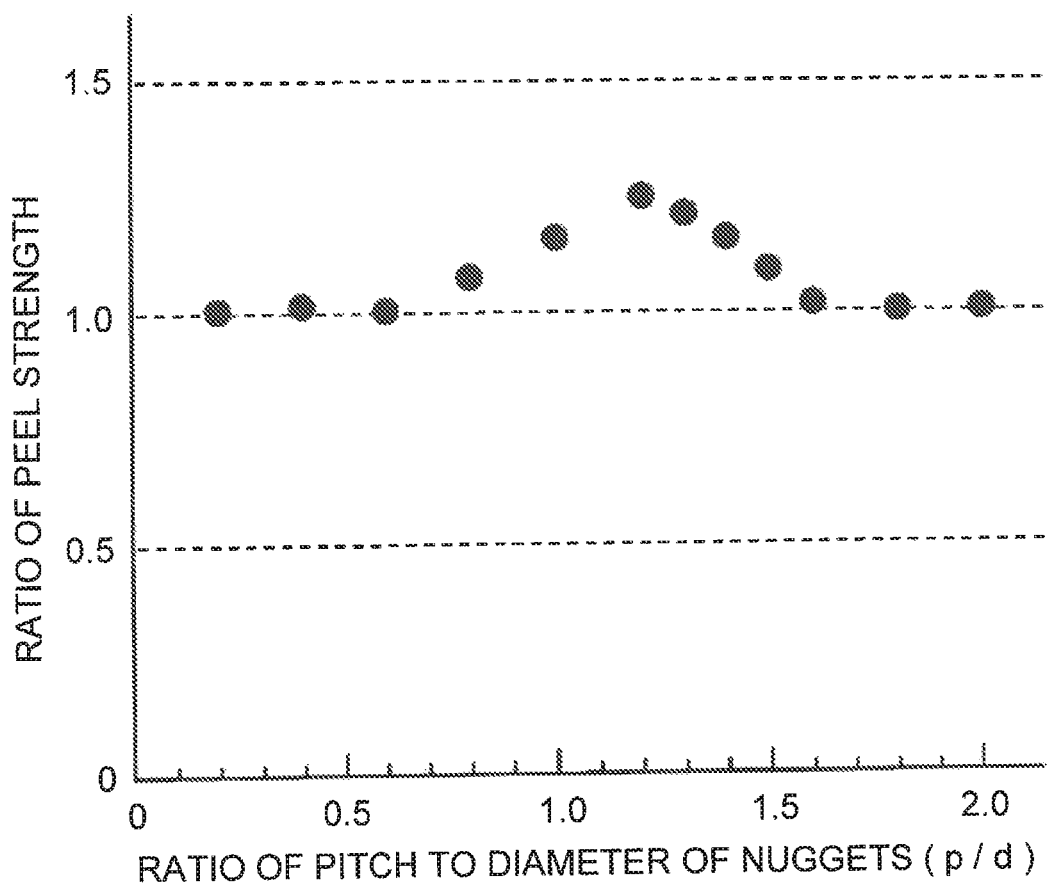

WELDING METHOD AND WELDED STRUCTURE

INCORPORATION BY REFERENCE

The disclosure of Japanese Patent Application No. 2016-200208 filed on Oct. 11, 2016 including the specification, drawings and abstract is incorporated herein by reference in its entirety.

BACKGROUND

1. Technical Field

The present disclosure relates to a welding method and a welded structure.

2. Description of Related Art

Japanese Patent Application Publication No. 2015-205323 discloses a welded structure having a plurality of objects to be welded that are joined together through a weld formed by laser welding. This weld has a plurality of nuggets that are formed along an imaginary closed curved line on the objects to be welded.

SUMMARY

The welding method in which a plurality of nuggets arranged along an imaginary closed curved line are formed by laser welding requires a larger welding area than a method in which a plurality of nuggets arranged along an imaginary straight line or an imaginary open curved line are formed by laser welding. For this reason, the above welding method cannot be used when welding together a plurality of objects to be welded in which an allowance for welding points is small.

The present disclosure provides a welding method that can be used in a part where an allowance for welding points is small, and that can enhance the peel strength of a plurality of objects to be welded compared with welding together the objects to be welded with one nugget, and further provides a welded structure.

A first aspect of the present disclosure is a welding method including joining together a plurality of objects to be welded by forming adjacent nuggets in the plurality of objects to be welded by laser welding, wherein, when the distance between central axes of the adjacent nuggets is p and the diameter of the adjacent nuggets in the plurality of objects to be welded is d, the adjacent nuggets are formed so as to satisfy an equation $1.0 < p/d \le 1.6$.

In this welding method, the nuggets are formed in the ratio p/d of higher than 1.0. Thus, the distance p between the central axes of the adjacent nuggets becomes longer than the diameter d of the nuggets. Accordingly, the centers of welding points are kept away from each other, so that solidification cracks are prevented from connecting to each other in metals that undergo significant solidification shrinkage. Therefore, compared with a method in which the ratio p/d is not higher than 1.0, this method can prevent welding imperfections such as poor appearance and an increased risk of fatigue cracking. Moreover, forming the nuggets in the ratio p/d of not higher than 1.6 can enhance the peel strength of the objects to be welded despite a small allowance for welding points.

In the first aspect of the present disclosure, the adjacent nuggets may be formed on an imaginary straight line or an imaginary open curved line.

In the first aspect of the present disclosure, the number of the adjacent nuggets may be two or three.

In the first aspect of the present disclosure, the objects to be welded may be made of an aluminum alloy.

A second aspect of the present disclosure is a welded structure including a plurality of objects to be welded that have adjacent nuggets and are joined together by laser welding, wherein, when the distance between central axes of the adjacent nuggets is p and the diameter of the adjacent nuggets in the plurality of objects to be welded is d, an equation $1.0 < p/d \le 1.6$ is satisfied.

In this welded structure, the nuggets are formed in the ratio p/d of higher than 1.0. Thus, the distance p between the central axes of the adjacent nuggets becomes longer than the diameter d of the adjacent nuggets. Accordingly, the centers of welding points are kept away from each other, so that solidification cracks are prevented from connecting to each other in metals that undergo significant solidification shrinkage. Therefore, compared with a method in which the ratio p/d is not higher than 1.0, this method can prevent welding imperfections such as poor appearance and an increased risk of fatigue cracking. Moreover, forming the nuggets in the ratio p/d of not higher than 1.6 can enhance the peel strength of the objects to be welded despite a small allowance for welding points.

In the second aspect of the present disclosure, the adjacent nuggets may be disposed on an imaginary straight line or an imaginary open curved line.

In the second aspect of the present disclosure, the number of the adjacent nuggets may be two or three.

In the second aspect of the present disclosure, the objects to be welded may be made of an aluminum alloy.

The present disclosure can be applied to a part where an allowance for welding points is small, and can enhance the peel strength of a plurality of objects to be welded compared with welding the objects to be welded with one nugget.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a graph showing a relation between a ratio p/d of a pitch to a diameter of nuggets according to the embodiment and a ratio of peel strength of the test piece;

DETAILED DESCRIPTION OF EMBODIMENTS

Figure 1A:
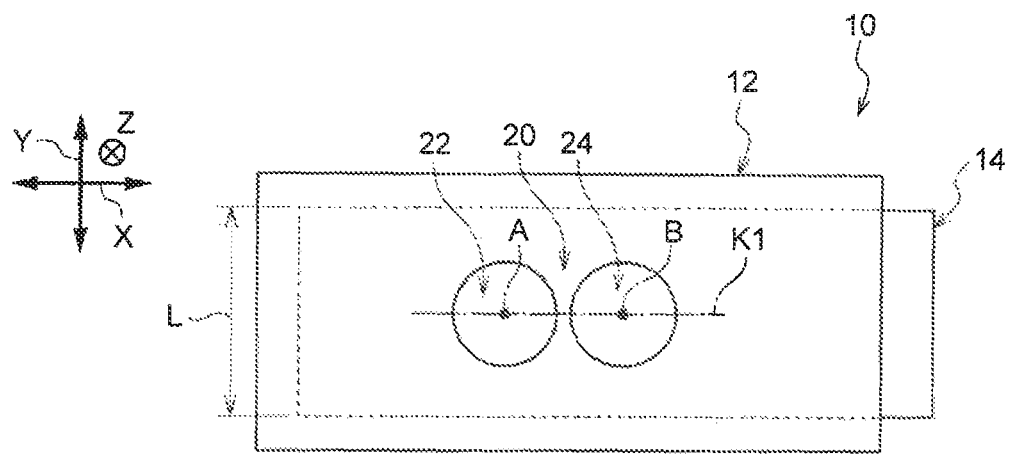
FIG. 1A is a plan view of a welded structure according to an embodiment.

FIG. 1A shows a welded structure 10 as an example of an embodiment. The welded structure 10 has an object to be welded 12 and an object to be welded 14. For example, the object to be welded 12 is a metal plate having a quadrangular shape in a plan view. For example, the object to be welded 14 is a metal plate having a quadrangular shape in a plan view. These metal plates are plate materials for vehicles, and are aluminum alloy plates, for example. In the following description, one direction of in-plane directions of the object to be welded 12 and the object to be welded 14 will be referred to as an X-direction, and another in-plane direction of the object to be welded 12 and the object to be welded 14 that is orthogonal to the X-direction will be referred to as a Y-direction. A direction orthogonal to the X-direction and the Y-direction will be referred to as a Z-direction.

Figure 1B:
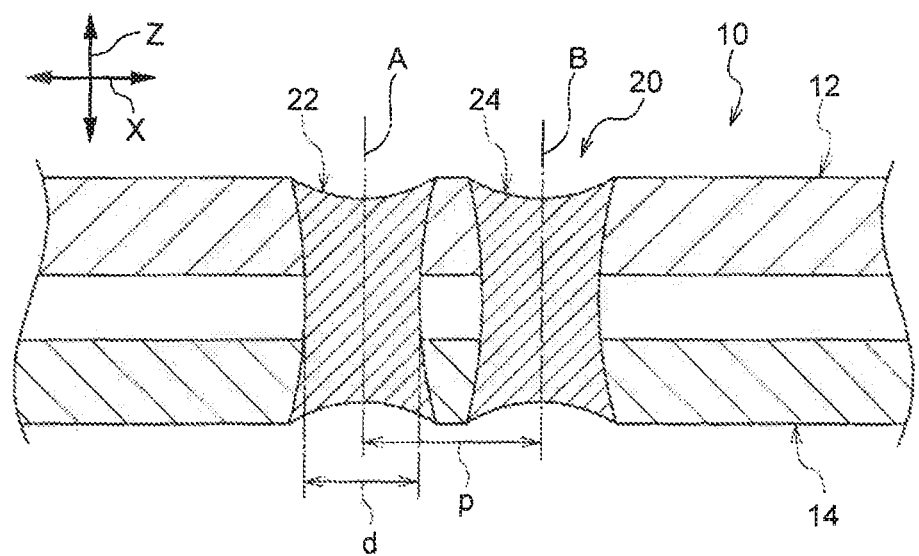
FIG. 1B is a vertical sectional view of the welded structure according to the embodiment.

As shown in FIG. 1B, the object to be welded 12 and the object to be welded 14 are placed on top of each other. For example, the object to be welded 12 and the object to be welded 14 are joined together through a weld 20. As will be described later, the weld 20 is formed by laser welding. During laser welding, a laser beam is applied to the object to be welded 12. The object to be welded 14 is an object to be welded located on a side not irradiated with a laser beam.

For example, the weld 20 is composed of nuggets 22, 24. For example, the nuggets 22, 24 each have a substantially circular shape when seen in the Z-direction. The nuggets 22, 24 each have an hourglass shape in an X-Z section when seen in the Y-direction. In FIG. 1B, a central axis A of the nugget 22 and a central axis B of the nugget 24 are indicated by dot-and-dash lines. For example, the central axis A and the central axis B extend along the Z-direction.

As shown in FIG. 1A, a straight line passing through the central axis A of the nugget 22 and the central axis B of the nugget 24 will be referred to as an imaginary straight line K1. For example, the imaginary straight line K1 extends along the X-direction. In this embodiment, the nugget 22 and the nugget 24 will be described as being of the same shape and the same size as an example. The length in the Y-direction of an area of contact between the object to be welded 12 and the object to be welded 14 will be referred to as an allowance for welding points L. In this embodiment, a part where the allowance for welding points L is small means, for example, a part where the allowance for welding points L is 5 [mm] to 10 [mm] or a part where the allowance for welding points L is smaller than 5 [mm].

As shown in FIG. 1B, the diameter of the nugget 22 in a plane (X-Y plane) orthogonal to a joint direction (Z-direction) of the objects to be welded 12, 14 is d [mm]. Specifically, the diameter of the nugget 22 between the object to be welded 12 and the object to be welded 14 (between the plates) is d [mm]. The distance between the central axes of the welding points of the adjacent nuggets 22, 24 (the distance between the central axis A and the central axis B in the X-direction) is p [mm]. In the following description, the distance p between the central axes of the nuggets 22, 24 will be referred to as a pitch p.

Here, the nuggets 22, 24 are formed in the object to be welded 12 and the object to be welded 14 so that the diameter d [mm] and the pitch p [mm] satisfy an equation $1.0 < p/d \leq 1.6$. In other words, the nuggets 22, 24 are formed in the object to be welded 12 and the object to be welded 14 so that the ratio of the pitch p [mm] to the diameter d [mm] is higher than 1.0 but not higher than 1.6.

If the nuggets 22, 24 have elliptical outer shapes, the diameter d [mm] may be the length of the ellipse in the X-direction, or may be an average length of the major axis length and the minor axis length. In this embodiment, the nugget 22 and the nugget 24 are of the same shape and the same size. However, if the nugget 22 and the nugget 24 have different diameters d, for example, an average value of their diameters d may be calculated and this average diameter d may be used.

Figure 2:
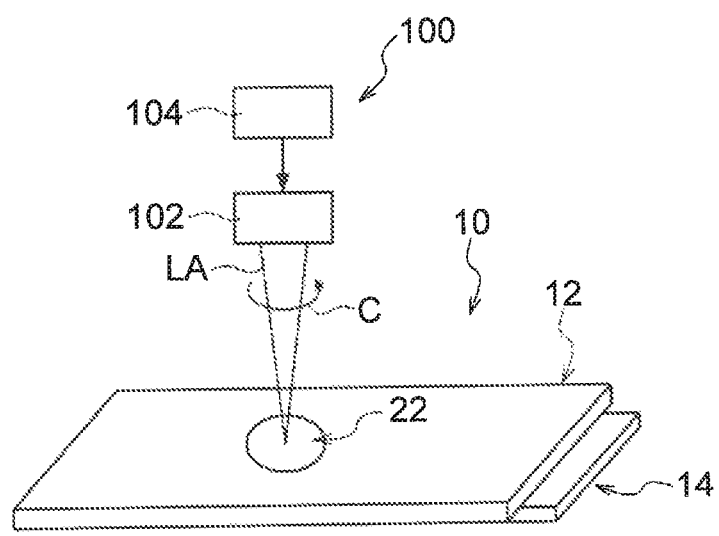
FIG. 2 is a view illustrating a state of the welded structure according to the embodiment being welded.

FIG. 2 shows a welding method of welding together the object to be welded 12 and the object to be welded 14. The welding method in this embodiment is performed by a welding apparatus 100. The welding apparatus 100 includes an irradiation unit 102 that applies a laser beam LA toward the object to be welded 12, and a control unit 104 that controls operation of the irradiation unit 102.

For example, the irradiation unit 102 is a laser scanner, such as a galvano scanner, and applies the laser beam LA to a predetermined position of the object to be welded 12 by controlling the orientation of a built-in galvano mirror (not shown). Thus, the nugget 22 is formed at a position irradiated with the laser beam LA. The control unit 104 controls the orientation of the galvano mirror of the irradiation unit 102 so that the adjacent nuggets 22, 24 are formed so as to meet the condition $1.0 < p/d \leq 1.6$.

In this embodiment, for example, a scanning formation method is used to form the nugget 22. In the scanning formation method, for example, the laser beam LA is scanned over the object to be welded 12 along a circumferential trajectory as indicated by the arrow C to form the nugget 22. In other words, the control unit 104 controls the operation of the irradiation unit 102 so that the laser beam LA is scanned along a circumferential trajectory at a position of the object to be welded 12 at which the nugget 22 is to be formed. After the nugget 22 is formed, the control unit 104 controls the operation of the irradiation unit 102 so that the laser beam LA is applied to a position at which the nugget 24 (see FIG. 1A) is to be formed.

<Peel Strength Test>

A peel strength test conducted on the object to be welded 12 and the object to be welded 14 having been welded together will be described. This peel strength test was conducted using the test machine AG-20kN/50kNXDplus (Shimadzu Corporation).

Peel strength is represented by a maximum value of a tensile load that is applied in a peeling direction in which the objects to be welded 12, 14 having been jointed together are peeled (a thickness direction of the objects to be welded 12, 14), and that the objects to be welded 12, 14 can withstand without peeling. The ratio of peel strength is represented as a ratio of the peel strength of the weld 20, formed by the welding method of this embodiment, to the peel strength of a weld at which the objects to be welded 12, 14 are joined together with one nugget comparable in size to the nugget 22 (see FIG. 1A).

(Test Piece)

Figure 3:
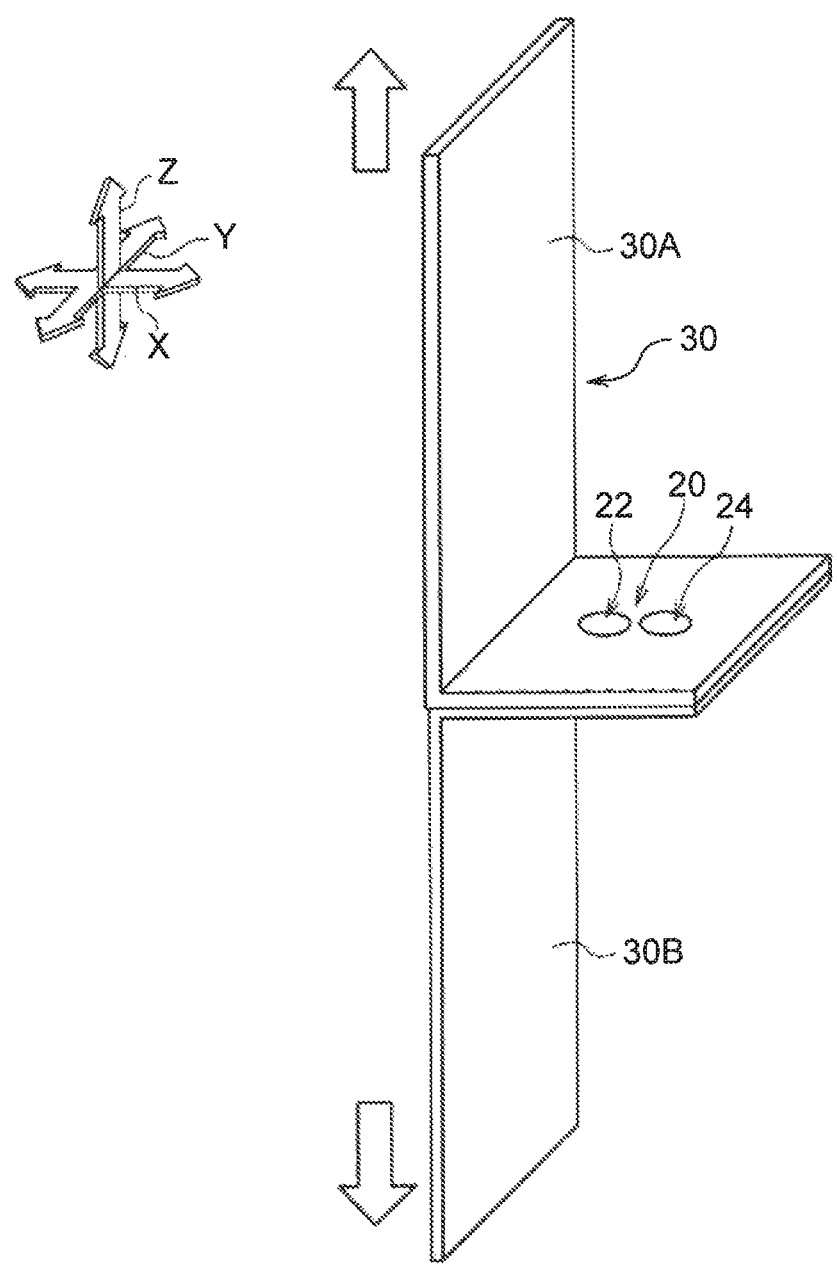
FIG. 3 is a perspective view showing a test piece of the welded structure according to the embodiment.

As shown in FIG. 3, a 1.2 [mm] thick 6000-series aluminum alloy plate material 30A and a 0.9 [mm] thick 6000-series aluminum alloy plate material 30B were prepared, and these plate materials were each bent into an L-shape and welded together to form a test piece 30 (weld 20). The focused diameter φ of the laser beam LA (see FIG. 2) was approximately 0.4 [mm], and the laser beam LA was scanned in a circular shape. A plurality of test pieces 30 with the ratio p/d of the pitch p to the diameter d varying from 0.2 to 2.0 were prepared by shifting the formation position of the nugget 24 in the X-direction while fixing the formation position of the nugget 22.

In the peel strength test, a pair of (two) test pieces 30 shown in FIG. 3 were prepared, and the test was conducted on the test pieces 30 placed back-to-back (in the form of a cross) with one test piece 30 disposed upside down relative to the other test piece. Test data obtained was halved and the halved value was used as peel strength. A test piece with one nugget serving as a comparison object was prepared, and the peel strength test was conducted thereon in the same manner.

(Test Result)

FIG. 4 shows a relation between the ratio p/d of the pitch p to the diameter d of the nugget 22 (see FIG. 1B) and the ratio of peel strength of the test piece 30 (see FIG. 3).

In a range of the ratio p/d not higher than 0.6 or higher than 1.6, the ratio of peel strength was about 1.0. In other words, in the welded structure in which the objects to be welded were welded (joined) together so that the ratio p/d is within the range of not higher than 0.6 or higher than 1.6, the peel strength of the weld was comparable to the peel strength in the case where the objects to be welded were joined together with one nugget. Thus, it was confirmed that, if the ratio p/d is not higher than 0.6 or higher than 1.6, forming the weld with two nuggets could hardly enhance the peel strength compared with the peel strength in the case where the objects to be welded were joined together with one nugget.

By contrast, in the range of the ratio p/d higher than 0.6 but not higher than 1.6, the ratio of peel strength was higher than 1.0. In other words, in the welded structure in which the objects to be welded were welded (joined) together so that the ratio p/d is within the range of higher than 0.6 but not higher than 1.6, the peel strength of the weld was higher than the peel strength in the case where the objects to be welded were joined together with one nugget. Thus, it was confirmed that, in the range of the ratio p/d higher than 0.6 but not higher than 1.6, forming the weld 20 (see FIG. 1A) with the nuggets 22, 24 (see FIG. 1A) could enhance the peel strength compared with the peel strength in the case where the objects to be welded were joined together with one nugget.

An X-ray observation of the welded test piece 30 (see FIG. 3) found solidification cracks between the nugget 22 and the nugget 24 (see FIG. 3) in the case of the range of the ratio p/d higher than 0.2 but not higher than 1.0. Thus, in the case of the range of the ratio p/d higher than 0.6 but not higher than 1.0, solidification cracks connect to each other, which makes this range inappropriate as a condition to be used. Specifically, this range is inappropriate as a condition to be used, because, if solidification cracks connect to each other, these cracks cause welding imperfections such as poor appearance and an increased risk of fatigue cracking in the welded structure 10 (see FIG. 1A).

Based on the above result, the range of the ratio p/d in the welding method and the welded structure 10 (see FIG. 1A) of this embodiment is set to 1.0<p/d≤1.6.

[Effects]

Next, effects of the welding method and the welded structure 10 of this embodiment will be described.

In the welded structure 10 shown in FIGS. 1A and 1B and the welding method to produce the welded structure 10, the nuggets 22, 24 are formed in the ratio p/d of higher than 1.0. Thus, the pitch p between the adjacent nuggets 22, 24 becomes longer than the diameter d of the nuggets 22, 24. Accordingly, the centers of welding points in the objects to be welded 12, 14 are kept away from each other, so that solidification cracks are prevented from connecting to each other. Therefore, compared with a method in which the ratio p/d is not higher than 1.0, this method can prevent welding imperfections such as poor appearance and an increased risk of fatigue cracking. In the event of fracture, development of cracks can be prevented by the base metal of the objects to be welded 12, 14 present between the nuggets 22, 24, so that the peel strength can be enhanced.

Moreover, forming the nuggets 22, 24 in the ratio p/d of not higher than 1.6 can enhance the peel strength of the objects to be welded 12, 14 compared with the peel strength in the case where one nugget is formed. A possible reason is that the stress exerted on one nugget 22 or nugget 24 is distributed by an interaction between the nuggets 22, 24. In other words, if the nuggets 22, 24 are too far apart from each other, no interaction occurs between the nuggets 22, 24 and these nuggets fracture one by one, so that the peel strength of the objects to be welded 12, 14 is not enhanced. Thus, forming the nuggets at the ratio p/d of not higher than 1.6 can enhance the peel strength of the objects to be welded 12, 14 despite the small allowance for welding points L (see FIG. 1A).

In this embodiment, the imaginary straight line K1 of the welded structure 10 is disposed along the X-direction, but the configuration of the welded structure is not limited to this example.

First Modified Example

Figure 5A:
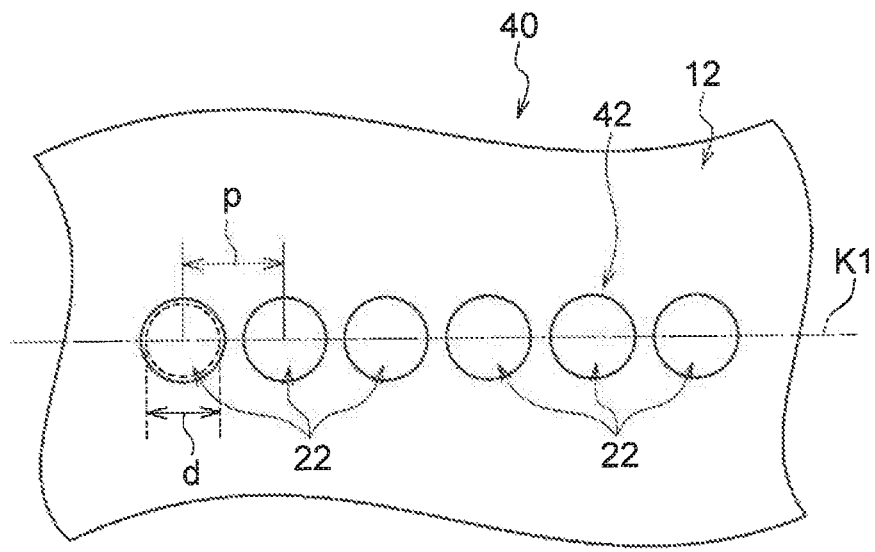
FIG. 5A is a plan view of a welded structure in a first modified example of the embodiment.

FIG. 5A shows a welded structure 40 as a first modified example. In the welded structure 40, a weld 42 is formed in which a line passing through the central axes (not shown) of the six nuggets 22 is the imaginary straight line K1. The ratio p/d of the two nuggets 22 adjacent to each other on the imaginary straight line K1 is 1.0<p/d≤1.6. Thus, the number of the nuggets 22 may be a plural number of three or larger. However, from the viewpoint of productivity, it is desirable that the number of the nuggets is two or three.

Second Modified Example

Figure 5B:
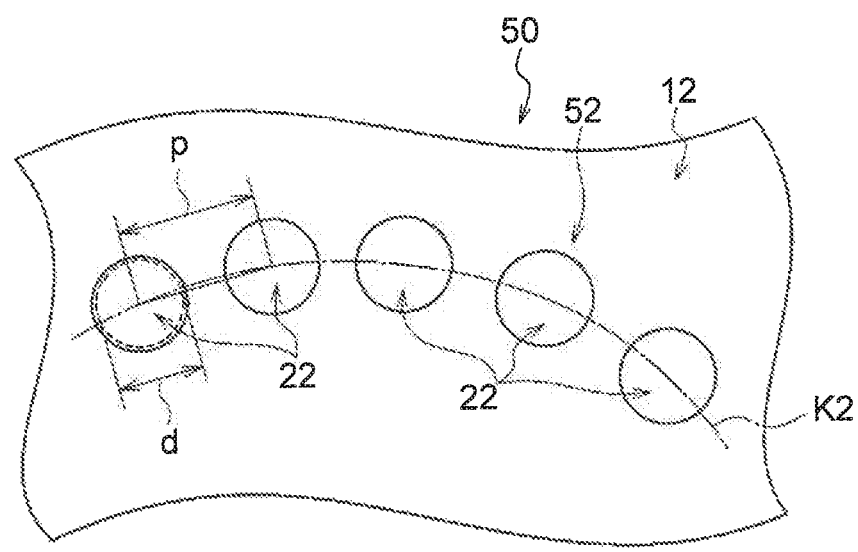
FIG. 5B is a plan view of a welded structure in a second modified example of the embodiment.

FIG. 5B shows a welded structure 50 as a second modified example. In the welded structure 50, a weld 52 is formed in which a line passing through the central axes (not shown) of the five nuggets 22 is an imaginary open curved line K2. The ratio p/d of the two nuggets 22 adjacent to each other on the imaginary open curved line K2 is 1.0<p/d≤1.6. Thus, the plurality of nuggets 22 may be disposed so that the line passing through the central axes of the plurality of nuggets 22 is the imaginary open curved line K2. The number of the nuggets 22 disposed on the imaginary open curved line K2 is not limited to five, but may be a plural number of two, three, four, or six or larger. However, from the viewpoint of productivity, it is desirable that the number of the nuggets is two or three.

Other Modified Examples

In this embodiment, the number of the objects to be welded is two as an example, but the number is not limited to this example. The number of the objects to be welded may be three or more. The objects to be welded 12, 14 are not limited to objects that are placed on top of each other in the Z-direction, but may be objects that are disposed at an interval in the Z-direction. The welding method according to this embodiment can be applied to any objects to be welded regardless of whether the objects to be welded are surface-treated.

The welding method for forming the nuggets 22, 24 is not limited to the scanning formation method, and other formation methods such as a fixed-point formation method, filling formation method, and screw formation method can be used. In the fixed-point formation method, a laser beam is applied to a predetermined point in an object to be welded for a certain period of time to form the nuggets 22, 24. In the filling formation method, first, a laser beam is scanned along a circumferential trajectory to form an annular nugget. Then, a laser beam is scanned so as to fill the inside of the formed annular nugget to form the nuggets 22, 24. In the screw formation method, a laser beam is scanned along a spiral trajectory over an object to be welded to form the nuggets 22, 24.

It is desirable that the pitch between one group of welding points (weld 20 shown in FIG. 1A) and another is set to be 20 [mm] or larger so as to suppress the influence of an interaction between the groups of welding points.

The objects to be welded may be made of other material than an aluminum alloy or high-carbon steel that undergo significant solidification shrinkage and are prone to solidification cracking.

While the welding methods and the welded structures according to the embodiment and the modified examples have been described above, it should be understood that these embodiment and modified examples may be combined as appropriate, or that the present disclosure can be implemented with various different aspects within the scope of the gist of the disclosure.

What is claimed is:

1. A welding method comprising:
    joining together a plurality of objects to be welded by forming adjacent nuggets in the plurality of objects to be welded by laser welding, the adjacent nuggets being formed on an imaginary straight line or on an imaginary open curved line,
    wherein a distance between central axes of the adjacent nuggets is p, a diameter of the adjacent nuggets in the plurality of objects to be welded is d, and the adjacent nuggets are formed so as to satisfy an equation $1.0 < p/d \leq 1.4$.

2. The welding method according to claim 1, wherein a number of the adjacent nuggets is two or three.

3. The welding method according to claim 2, wherein the plurality of objects to be welded are made of an aluminum alloy.

4. A welded structure comprising:
    a plurality of objects to be welded and joined together by laser welding, the plurality of objects having adjacent nuggets, the adjacent nuggets being formed on an imaginary straight line or on an imaginary open curved line,
    wherein a distance between central axes of the adjacent nuggets is p, a diameter of the adjacent nuggets in the plurality of objects to be welded is d, and an equation $1.0 < p/d \leq 1.4$ is satisfied.

5. The welded structure according to claim 4, wherein a number of the adjacent nuggets is two or three.

6. The welded structure according to claim 5, wherein the plurality of objects to be welded are made of an aluminum alloy.

* * * * *